United States Patent
Lee et al.

(10) Patent No.: US 12,038,121 B2
(45) Date of Patent: Jul. 16, 2024

(54) HEAT CONSERVATION-INSULATING MATERIAL COATED WITH UV CURING-TYPE FILM AND HAVING MAXIMIZED HEAT EFFICIENCY, AND METHOD FOR MANUFACTURING SAME

(71) Applicant: SEWOON T&S CO., LTD., Yeongcheon-si (KR)

(72) Inventors: Pil Sea Lee, Andong-si (KR); Seung Won Lee, Yeongcheon-si (KR)

( * ) Notice: Subject to any disclaimer, the term of this patent is extended or adjusted under 35 U.S.C. 154(b) by 557 days.

(21) Appl. No.: 17/260,385

(22) PCT Filed: Apr. 1, 2019

(86) PCT No.: PCT/KR2019/003793
§ 371 (c)(1),
(2) Date: Jan. 14, 2021

(87) PCT Pub. No.: WO2020/017736
PCT Pub. Date: Jan. 23, 2020

(65) Prior Publication Data
US 2021/0293368 A1    Sep. 23, 2021

(30) Foreign Application Priority Data

Jul. 18, 2018 (KR) .......................... 10-2018-0083523

(51) Int. Cl.
*F16L 59/02* (2006.01)
*C03C 25/20* (2006.01)
(Continued)

(52) U.S. Cl.
CPC .............. *F16L 59/02* (2013.01); *C03C 25/20* (2013.01); *C03C 25/326* (2013.01); *C03C 25/64* (2013.01);
(Continued)

(58) Field of Classification Search
CPC ..... C08F 2/50; C08G 18/672; C08G 18/6725; C08G 18/673; F16L 59/00; F16L 59/02
See application file for complete search history.

(56) References Cited

U.S. PATENT DOCUMENTS

2014/0142210 A1* 5/2014 Zhang ................ C08F 290/067
526/320

FOREIGN PATENT DOCUMENTS

JP      2014-523472 A      9/2014
KR      10-0274314         12/2000
(Continued)

OTHER PUBLICATIONS

English Specification of 10-1336964.
(Continued)

*Primary Examiner* — Zachary M Davis
(74) *Attorney, Agent, or Firm* — ANTONIO HA & U.S. PATENT, LLC

(57) ABSTRACT

The present invention relates to a heat conservation-insulating material which is coated with a UV film and has maximized heat efficiency, wherein: the material uses a thermosetting water-soluble acrylic adhesive to ensure the minimum uniform coating film thickness required for corrosion prevention of a pipe and strength reinforcement during curing and allow easy installation with flexibility and sufficient working time before the installation; and a surface of the insulating material is UV-coated and thermosetting-coated by dual-cure curing method so that even a part where light or ultraviolet rays cannot penetrate can be cured, a heat conservation-insulating material having vivid colors can be (Continued)

obtained even when dye and pigment are added to realize various colors, and the cutting processability is excellent to enable a uniform coating on various surfaces, such as metal, plastic, glass, ceramics, stone, wood, and various building materials, or even on sharply bent shapes.

7 Claims, 1 Drawing Sheet

(51) Int. Cl.
    *C03C 25/326*     (2018.01)
    *C03C 25/64*     (2006.01)
    *C08F 2/50*     (2006.01)
    *C08F 20/28*     (2006.01)
    *C08G 18/08*     (2006.01)
    *C08G 18/67*     (2006.01)
    *C09J 4/00*     (2006.01)
    *C09J 175/14*     (2006.01)
    *F16L 58/10*     (2006.01)

(52) U.S. Cl.
    CPC ................ *C08F 2/50* (2013.01); *C08F 20/28* (2013.01); *C08G 18/0852* (2013.01); *C08G 18/0876* (2013.01); *C08G 18/673* (2013.01); *C09J 4/00* (2013.01); *C09J 175/14* (2013.01); *F16L 58/1054* (2013.01)

(56) References Cited

FOREIGN PATENT DOCUMENTS

| KR | 10-0522568 | 10/2005 |
| KR | 10-2007-0096329 | 10/2007 |
| KR | 10-1311967 | 9/2013 |
| KR | 10-1336964 | 12/2013 |
| KR | 10-1602656 | 3/2016 |
| KR | 10-1921066 | 11/2018 |

OTHER PUBLICATIONS

English Specification of JP2014-523472A.
English Specification of 10-1311967.
English Specification of 10-2007-0096329.
English Specification of 10-1602656.
English Specification of 10-1921066.
English Specification of 10-027434.
English Specification of 10-0522568.

\* cited by examiner

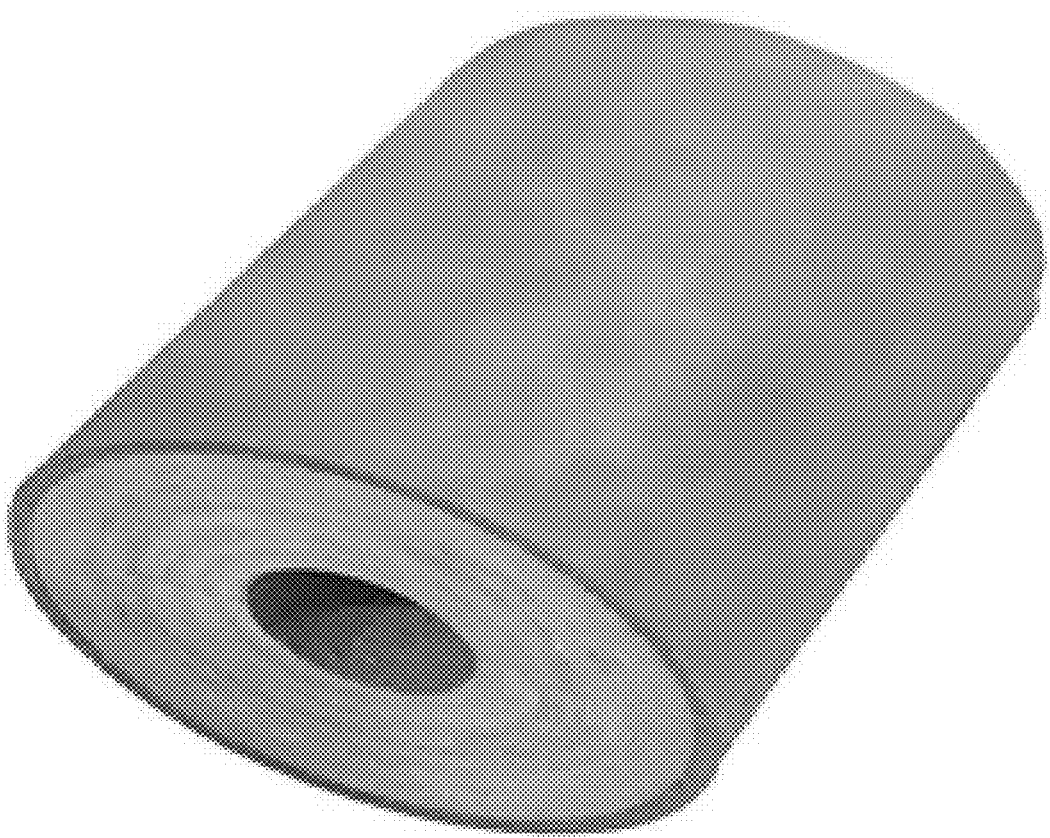

HEAT CONSERVATION-INSULATING MATERIAL COATED WITH UV CURING-TYPE FILM AND HAVING MAXIMIZED HEAT EFFICIENCY, AND METHOD FOR MANUFACTURING SAME

TECHNICAL FIELD

The present invention relates to an industrial thermal insulation material coated with a UV film that maximizes thermal efficiency, and more specifically, to a waterproof, high-thermal efficiency, and high non-flammable UV film-coated thermal insulation material for use as a cover in or for petroleum chemical plants, power plants, steel making plants, chemical storage tanks, oil tanks, shipbuilding (ships), building interior and exterior materials, ground or underground pipelines, roofs, linings, etc.

Thermal insulation is the reduction of heat loss or inflow of heat to the outside by covering the outside of the part to be kept at a constant temperature and is called cold insulation if used at 100° C. or less, hot insulation if used at 100° C. to 500° C., heat insulation if used at 500° C. to 1,100° C., and fireproof insulation if used at 1,100° C. or higher. Low thermal conductivity is preferable for thermal insulation, but most of thermal insulation materials do not have low thermal conductivity. Thus, pores are formed in the thermal insulation material to enhance thermal conductivity.

Materials for thermal insulation may be classified into organic and inorganic materials, and organic materials include cork, cotton, felt, carbonized cork, and foam rubber, and inorganic materials include asbestos, glass wool, quartz wool, diatomaceous earth, calcium silicate, and pearlite.

BACKGROUND ART

As described above, when the fluid is transferred through the pipe in the plant industry, the pipe is wrapped around by a thermal insulation material to prevent the change in the properties of the fluid and to save energy. In particular, since the fluid used in the piping of power plants, petroleum chemical plants, and ships generates high heat, the thermal insulation material needs to be formed of a material with high thermal insulation and fire resistance so as to provide satisfactory thermal insulation while preventing fire. In particular, in the plant industry, metallic components are exposed to strong acid or base products, thus corroded, causing various problems with insulation. To satisfy these conditions, thermal insulation materials are being developed which use asbestos, rock wool, ceramic fiber, calcium silicate, pearlite, or vermiculite, which have superior thermal insulation properties, electrical insulation, fire resistance, sound absorption, corrosion resistance, and water resistance. Among them, the glass fiber (E-glass fiber) has advantages, such as high electrical insulation, excellent spinnability, high weather resistance and heat resistance, and low light weight with high porosity, but suffers from relatively low strength—thus, its use is limited in the fields requiring high strength and high functionality and is vulnerable to external physical impacts, and moisture and heat, and resultantly short service life. To address the foregoing issues, Korean Patent No. 1403289 discloses a method for manufacturing a fire-resistant thermal insulation material having superior anti-impact properties at ultra-low temperature, which includes, after forming a needle punched composite nonwoven fabric composed of glass fiber, polypropylene fiber, and meta-aramid fiber, melting the polypropylene fiber included in the needle punched composite nonwoven fabric, placing a non-combustible aluminum thin film on both surfaces of the needle punched composite nonwoven fabric and then compressing the needle punched composite nonwoven fabric to a thickness of 1.5 mm to 4.5 mm to thereby manufacture a formed needle punched composite nonwoven fabric. However, the thermal insulation material disclosed in the reference includes both inorganic fiber and organic fiber and resultantly suffers from reduced thermal insulation properties. Further, Korean Patent Nos. 274314 and 522568, by the present applicant regarding a method for manufacturing insulation pipes using a glass fiber mat, disclose thermal insulation pipes that may withstand high heat by the nature of glass fibers and have high thermal insulation and light weight and high density of about 180 kg/m$^3$ to 220 kg/m$^3$ by winding a binder-applied glass fiber mat around a forming roller and press-forming the same.

However, there is no technology for coating the surface of a thermal insulation material by double-curing which performs first ultra-violet (UV) curing on the surface of the thermal insulation material with a UV-cured film and then second thermal curing.

DETAILED DESCRIPTION OF INVENTION

Technical Problems

An object of the present invention is to provide an industrial thermal insulation material that is lightweight and has a small volume and superior thermal insulation, in which a thermosetting resin composition including a water-soluble acrylic adhesive, a curing agent, and a flame retardant is impregnated with a glass long fiber mat.

Another object of the present invention is to provide an industrial thermal insulation material having excellent water repellency and preventing corrosion to metal pipes by reducing chlorine (Cl—) ions or surface carbonization at high temperatures.

Still another object of the present invention is to provide an industrial thermal insulation material that may prevent carbonization or corrosion and have superior water repellency through strong adhesion by coating the surface of the industrial thermal insulation material with a dual-curable composition capable of securing high scratch resistance while maintaining excellent formability through dual curing by a dual-curable composition having both a thermosetting functional group and a UV curing functional group.

Means to Address Problems

The thermal insulation mat of the present invention for solving the above problems is manufactured by stacking and forming E-Glass long fibers. The raw materials for the glass fibers primarily include silica, limestone, and borax, and their physical properties vary according to their formulation. Therefore, it may be classified into A-glass, C-glass, E-glass, and S-glass depending on the composition of raw materials, and in the present invention, E-glass long fibers are used.

In the present invention, first, a thermosetting water-soluble acrylic adhesive composition of glass fiber is synthesized. In the present invention, the thermosetting adhesive may include a reactive acrylic monomer obtained by combining one or more selected from among B-carboxyethyl acrylate, octyl or decyl acrylate, isobonyl acrylate, 2-phenoxyethyl acrylate, urethane acrylate, dipropylene glycol diacrylate, and 6-hexanediol diacrylate, an acrylic oligomer selected from among aliphatic urethane acrylate, aliphatic urethane diacrylate, and aliphatic urethane triacrylate, a basic aqueous solution (—OH, SO4), and a thermosetting reaction initiator selected from among 2, 2-dimethoxy-1, 2-diphenyl-ethan-1-one, 1-hydroxy-cyclohexylphenyl-ketone-methyl-1-[4-(methylthio)phenyl]-2-morpholino-propan-1-one, 2-hydroxy-2-methyl-1-phenyl-propanone, and potassium persulfate, a sensitizer, a crosslinking agents, and a functional additive.

The binder composition of the present invention includes, with respect to 100 parts by weight of the thermosetting water-soluble acrylic adhesive, 20 to 40 parts by weight of water, 20 to 40 parts by weight of bentonite, 1 to 10 parts by weight of silica, a flame retardant, 1 to 10 parts by weight of nitrogen-based resin, 1-10 parts by weight of water repellent, 1-10 parts by weight of penetrant, 1-2 parts by weight of antifoaming agent, and 1-2 parts by weight of a dispersant.

The flame retardant may be one or more selected from among inorganic flame retardants including germanium, ceramic, silica, dolomite, or natural silica. The term "dispersant" may be a generic term for surfactants generally used in applications requiring a dispersing action and, as the dispersant, one or more of sodium oxyalkylether naphthalene sulfonate condensate, sodium alkyl diphenyl ether disulfonate, and sodium lignin sulfonate may be used.

Further, the thermal insulation material of the present invention may be configured in various forms. For example, the thermal insulation material may be prepared in a tube shape to cover a pipe or may be prepared in a sheet form.

In the present invention, the surface of the tube-shaped thermal insulation material is coated with a UV curable film in a dual-curing method.

A common raw material for UV curing coating is an acrylic resin having a double bond and, when a small amount of photo initiator is added thereto and irradiated with ultraviolet rays, polymerization is achieved due to rapid reactivity.

However, portions which cannot be reached by light or rays, or the opposite side of the light, or portions in which dyes and pigments are contained to implement various colors are uncured, resulting in corrosion, aging, fatigue or peeling and thus failure to obtain the desired physical properties of the product.

In the dual-curing method of the present invention, curing by UV (ultraviolet) radiation is primarily performed, and curing by heat is secondarily performed.

According to the present invention, the dual-curable resin may be synthesized using an acrylate monomer of 2-HEA (2-hydroxyethyl acrylate), 2-ethylhexyl acrylate (2-EHA), 2-hydroxyethyl methacrylate (2-HEMA), and 2-HPA (2-hydroxypropyl acrylate), an acrylate oligomer of aliphatic urethane diacrylate, aliphatic urethane triacrylate, or aliphatic urethane hexaacrylate acrylate, a photo initiator which is a photo initiator of benzoyl peroxide or 2,2'-azo-bis-isobutylnitrile (AIBN), and acrylic acid of acrylic photo initiator (4-benwophenone diethylene glycol acrylate). In this case, when a photo initiator that is curable with light of UV-A, UV-B, or UV-C wavelength is used, it is possible to secure a uniform coating thickness required for strength reinforcement and corrosion prevention during curing and to secure flexibility before work. Further, double curing includes the step of secondarily performing photo-curing by the dual-curable resin, one or two or more thermosetting polyols selected from among polyether polyol, polyester polyol, prolactone polyol, polycarbonate polyol, polybutadiene polyol, or alkyl polyol, one isocyanate selected from among TDI (toluene diisocynate), MDI (diphenylmethane diisocynate), MXDI (tetramethyl xylene diisocynate), XDI (xylene diisocyanate). IPDI (isophorone diisocyanate), or HMDI (hexamethylene diisocyanate), and acylphosphine oxide-, benzoyl peroxide-, or benzophenone-based photo initiator.

As described above, according to the present invention, to enable dual curing, rather than simply blending a thermosetting resin and a UV-curable resin, a functional group capable of UV curing is introduced into the polymer resin itself, thereby inducing three-dimensional crosslinked bonding. In particular, it is possible to mitigate the problem of being uncured due to failure for light to reach or use of pigment or dye and to secure high chemical resistance, heat resistance, and scratch resistance while maintaining excellent formability.

<UV Dual-Curable Paint Reaction Mechanism>

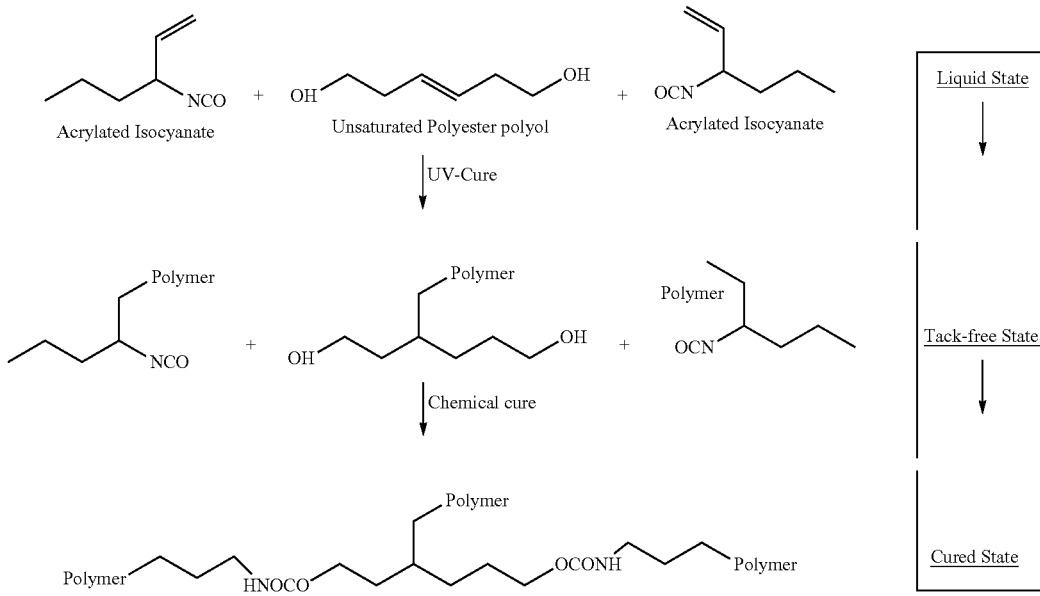

Effects of the Invention

According to the present invention, the thermal insulation material uses a thermosetting water-soluble acrylic adhesive, thus securing a minimum uniform coating thickness required for reinforcing strength during curing and preventing corrosion to pipes and providing ease of work with flexibility and sufficient working time before work. Further, in the thermal insulation material, the surface of the thermal insulation material is UV coated by dual-curing, making it possible to cure even portions where light or rays cannot reach and allowing the thermal insulation material to have vivid colors by adding dyes and pigments. Further, the thermal insulation material has good cutting processability and thus allows for a uniform coating even on highly uneven or curvy surfaces of metal, plastic, glass, ceramic, stone, wood, and various building materials.

BRIEF DESCRIPTION OF THE DRAWINGS

FIG. 1 is a view illustrating a configuration of a thermal insulation material in which a surface of a protective cover for pipe insulation is coated with a UV film.

BEST MODE TO PRACTICE THE INVENTION

Unless otherwise defined, all terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention are described in detail for a better understanding of the present invention. However, the embodiments herein amount to mere examples of the technical spirit of the present invention. There, it is apparent that the embodiments described herein are intended for describing the present invention but not for limiting the present invention and that the scope of the technical spirit of the present invention should not be limited thereto. It should be interpreted that other various changes or modifications or other specific embodiments easily inferred by one of ordinary skill in the art are included in the scope of the present invention without departing from the technical spirit of the present invention.

According to the present invention, in a thermosetting adhesive composition, a reactive acrylic monomer may be any one selected from among beta-carboxyethyl acrylate as represented in chemical formula (1), oxyethylated acrylate as represented in chemical formula (2), or 2-phenoxyehtyl acrylate or urethane acrylate as represented in chemical formula (3). A reaction initiator is composed of 2,2-dimethoxy-1,2-diphenyl-ethan-1-one as represented in chemical formula (4), 1-hydroxy-cyclohexylphenyl-ketone as represented in chemical formula (5), 2-methyl-1-[4-(methylthio)phenyl]-2-morpholino-propan-1-one as represented in chemical formula (6), or potassium persulfate as represented in chemical formula (7), and a photosensitizer, a crosslinking agent, and a functional additive may be added.

[Chemical formula 1]
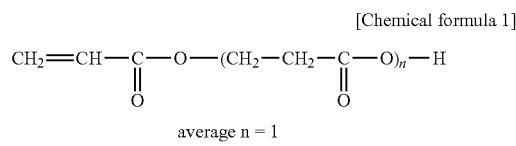
average n = 1

[Chemical formula 2]
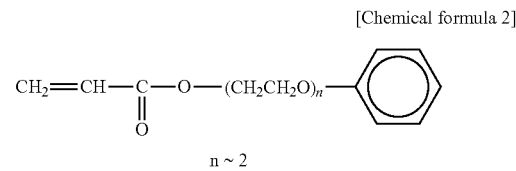
n ~ 2

[Chemical formula 3]
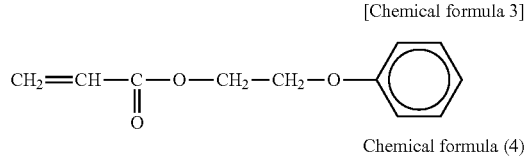

Chemical formula (4)
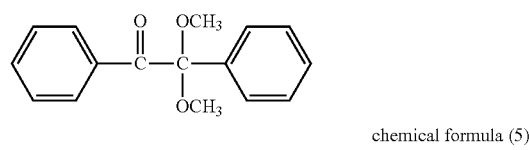

chemical formula (5)
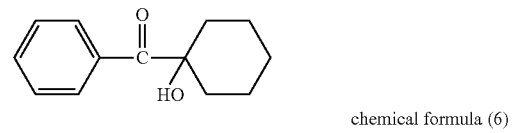

chemical formula (6)
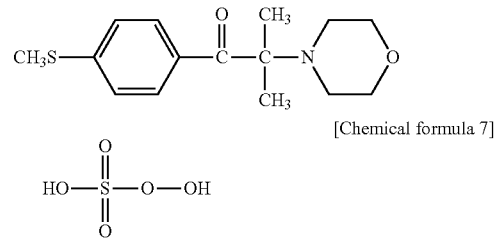

[Chemical formula 7]
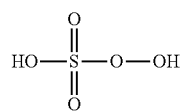

<Embodiment 1-3> Synthesis of Thermosetting Water-Soluble Acrylic Adhesive As illustrated in [Table 1], a thermosetting adhesive was synthesized by injecting an acrylic monomer, an acrylic oligomer, a basic aqueous solution, and a reaction initiator and then heating them.

TABLE 1

| | Components of adhesive | | |
|---|---|---|---|
| | Embodiment 1 | Embodiment 2 | Embodiment 3 |
| Acrylic monomer | Chemical formula 1 | Chemical formula 2 | Chemical formula 3 |
| Acrylic oligomer | Aliphatic Urethane-Aliphatic Acrylate Acrylate | Urethane-Aliphatic Acrylate Diacrylate | Urethane-Acrylate Triacrylate |
| Basic aqueous solution | —OH | —OH | —SO4 |
| Reaction initiator | Chemical formula 4 | Chemical formula 5 | Chemical formula 6 |
| Sensitizer | partially purified | porfimer sodium | Taporfin sodium |

<Embodiment 4-6> Composition of Inorganic Substance-Containing Binder

As illustrated in Table 2, a binder for an E-Glass long fiber mat was prepared by mixing a curable adhesive, water, bentonite, silica, flame retardant, nitrogen-based resin, water repellent, penetrant, and antifoaming agent dispersant.

TABLE 2

Composition of binder

| Components (parts by weight) | Embodiment 4 | Embodiment 5 | Embodiment 6 |
|---|---|---|---|
| Thermosetting adhesive | Embodiment 1 Adhesive: 100 | Embodiment 2 Adhesive: 100 | Embodiment 3 Adhesive: 100) |
| water | 20 | 30 | 40 |
| Bentonite | 30 | 20 | 40 |
| Silica | 5 | 5 | 7 |
| Flame retardant | 5 | 10 | 15 |
| Nitrogen-based resin | 2 | 4 | 6 |
| Water repellent | 2 | 4 | 6 |
| Penetrant | 6 | 4 | 2 |
| Antifoaming agent | 1 | 2 | 1 |
| Dispersant | 2 | 1 | 2 |

Among the components of the binder, it is preferable to contain 20-40 parts by weight of bentonite with respect to 100 parts by weight of the thermosetting adhesive. When the amount of bentonite is 40 parts by weight or more, the mechanical strength increases but the adhesive strength may reduce, and when the amount of the bentonite is 20 parts by weight or less, the mechanical strength may reduce. As the dispersant, sodium polyoxyalkylether naphthalene sulfonate-condensate was used in embodiment 4, sodium alkyl diphenyl ether disulfonate in embodiment 5, and sodium lignin sulfonate was used in embodiment 6. <Forming of thermal insulation cover>

The water-soluble binder of embodiment 4 was uniformly applied to the surface of the E-Glass long fiber mat, pressed with a roller, and then stacked and formed on a cylindrical jig, thereby producing a tube-shaped glass long fiber insulation material with various thicknesses. The tube-shaped E-Glass long fiber insulation material was dried for 2 to 6 hours at a temperature of about 180° C. to about 250° ° C. in a microwave and hot air drying device.

<Embodiment 7> Mixing of Dual-Curable Resin

30% by weight of 2-HEA, 40% by weight of 2-HEMA, and 30% by weight of (2-HEMA) were mixed, and 2,2'-azo-bis-isobutylnitrile (AIBN), as a photo initiator, was added at 60° C., and they were left to react for five hours, thereby reacting with a polymer having a solid content of 40 wt %, and is then mixed with 30 mol % of acrylic acid, synthesizing an acrylic functional group in the polymerized resin and finally preparing a double-curable resin having a solid content of 35 wt %.

<Embodiment 8> Coating of Dual-Curable Composition

The dual-curable coating composition resultant from mixing 50 g of the dual-curable resin of embodiment 7, an isocyanate. 25 g of polycarbonate polyol, 7 g of MDI, 7 g of benzoyl peroxide, as a photo initiator, and 30 g of MEK as a solvent, was coated on the thermal insulation cover of the present invention and was then dried at 60° ° C. for 5 minutes, then thermal-cured and aged at 50° C. for 3 hours, forming a hard coating layer.

Comparative Example

The product of the comparative example is a thermal insulation cover of E-Glass long fiber thermal insulation material coated with aluminum foil on the surface thereof.

<Functional Evaluation>

1) Gloss

The gloss was measured at an angle of 60° using a glossmeter.

2) Surface Hardness

The surface hardness was measured according to ASTM D3502.

3) Scratch Resistance

The hard coating layer was pressed hard and scratched with a spoon while moving back and forth five times, and was then left for 1 minute. Thereafter, the marks left on the surface of the coating layer were observed with the naked eye, and evaluated as two stages of excellent and poor.

Excellent: ○ (restored)

Normal: Δ (slightly restored)

Poor: X (not restored)

4) Flexibility

It was checked with the naked eye whether a crack occurs when the thermal insulation cover was elongated by 10%.

It was classified into two grades of (crack occurrence).

[Table 3] shows the results of testing the gloss, surface hardness, scratch resistance, and flexibility.

TABLE 3

|  | Gloss | Surface hardness | Scratch resistance | Flexibility |
|---|---|---|---|---|
| Embodiment 8 | 97 | Smooth | ○ | No crack |
| Comparative example | 82 | Slightly rough | X | Some cracks occur |

As shown from [Table 3], it was identified that the thermal insulation cover of the present invention has a gloss of 97 and has excellent surface hardness, scratch resistance, and flexibility.

INDUSTRIAL AVAILABILITY

The present invention relates to an industrial thermal insulation material coated with a UV film that maximizes thermal efficiency, and more specifically, to a waterproof, high-thermal efficiency, and high non-flammable UV film-coated thermal insulation material for use as a cover in or for petroleum chemical plants, power plants, steel making plants, chemical storage tanks, oil tanks, shipbuilding (ships), building interior and exterior materials, ground or underground pipelines, roofs, linings, etc. The present invention relates to a thermal insulation material that has good cutting processability and thus allows for a uniform coating even on highly uneven or curvy surfaces of metal, plastic, glass, ceramic, stone, wood and various building materials and a method for manufacturing the thermal insulation material.

The invention claimed is:

1. A method for manufacturing a thermal insulation material coated with a UV film to maximize thermal insulation efficiency, the method comprising the steps of:
   a) preparing a photo-curable adhesive by adding a reactive acrylic monomer obtained by combining one or two or more selected from chemical formula (1), chemical formula (2), and chemical formula (3), an acrylic oligomer selected from among aliphatic urethane acrylate, aliphatic urethane diacrylate, or aliphatic urethane triacrylate, a basic aqueous solution, and a reaction initiator obtained by combining one or two or more of chemical formula (4), chemical formula (5), or chemical formula (6), a sensitizer, a crosslinking agent, and a functional additive, wherein

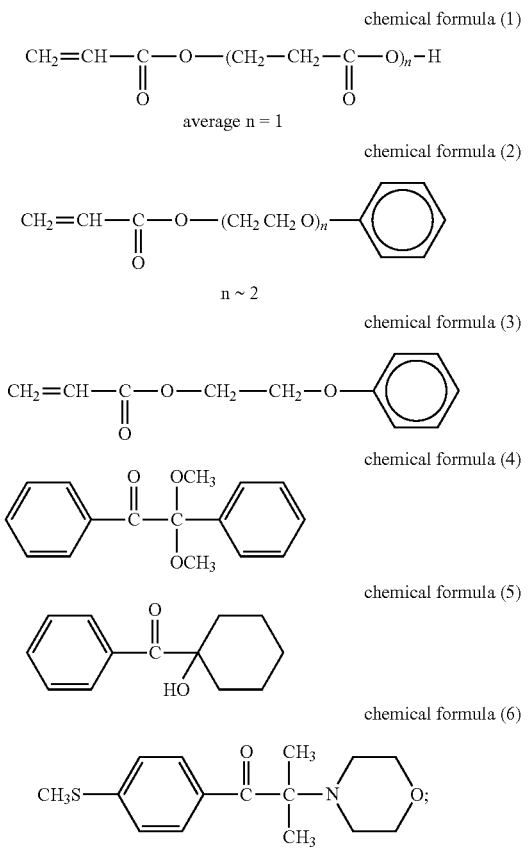

b) preparing a binder for an E-Glass long fiber mat by mixing a thermosetting adhesive, water, bentonite, silica, flame retardant, nitrogen containing resin, water repellent, penetrant, antifoaming agent, and dispersant;
   c) preparing an E-glass long fiber thermal insulation material by uniformly applying a water-soluble binder to a surface of the E-Glass long fiber mat, pressing with a roller, and stacking and forming on a cylindrical jig;
   d) drying the thermal insulation material separated from the forming roller at 150° C. to 200° C. for 10 minutes to 30 minutes; and
   e) coating a surface of a thermal insulation cover with a dual-curable coating composition prepared by synthesizing a dual-curable resin using one or two or more selected from an acrylate monomer and an oligomer and a photo initiator and then mixing a thermosetting resin, isocyanate, polyol, a photo initiator, and methyl ethyl ketone, as a solvent.

2. The method of claim 1, wherein in step (e), the acrylate monomer includes any one or two or more of 2-HEA (2-hydroxyethyl acrylate), 2-ethylhexyl acrylate (2-EHA), 2-hydroxyethyl methacrylate (2-HEMA), and 2-HPA (2-hydroxypropyl acrylate), and wherein the acrylate oligomer is any one of aliphatic urethane diacrylate, aliphatic urethane triacrylate, and aliphatic urethane hexaacrylate.

3. The method of claim 1, wherein in step (e), the isocyanate is one or two or more selected from among TDI (toluene diisocynate), MDI (diphenylmethane diisocynate), MXDI (tetramethyl xylene diisocynate), XDI (xylene diisocyanate), IPDI (isophorone diisocynate), or HMDI (hexamethylene diisocyanate).

4. The method of claim 1, wherein in step (e), the polyol is a polyether polyol, a polyester polyol, a prolactone polyol, a polycarbonate polyol, or a polybutadiene polyol.

5. The method of claim 1, wherein in step (b), the dispersant is one or two or more selected from among polyoxyalkyl ether, sodium naphthalene sulfonate condensate, sodium alkyl diphenyl ether disulfonate, or sodium lignin sulfonate.

6. A thermal insulation material coated with a UV film to maximize thermal insulation efficiency, prepared by:
   a) preparing a thermosetting adhesive by adding a reactive acrylic monomer represented in chemical formula (1), an acrylic oligomer selected from among aliphatic urethane acrylate, aliphatic urethane diacrylate, and aliphatic urethane triacrylate, a basic aqueous solution, a reaction initiator represented in chemical formula (4), and a sensitizer, wherein

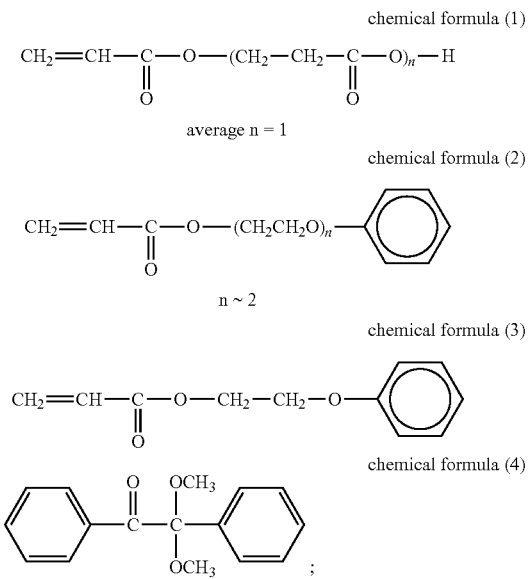

b) preparing a binder for an E-Glass long fiber mat by mixing the thermosetting adhesive, water, bentonite, silica, flame retardant, nitrogen containing resin, water repellent, penetrant, antifoaming agent, and dispersant;
   c) forming an E-glass long fiber thermal insulation material by uniformly applying a water-soluble binder to a surface of the E-Glass long fiber mat, pressing with a roller, and stacking and forming on a cylindrical jig and drying the E-glass long fiber thermal insulation material; and d) coating a surface of a thermal insulation cover with a dual-curable coating composition prepared by synthesizing a dual-curable resin using an acrylate monomer and an oligomer and a photo initiator and an acrylic acid, mixing a thermosetting resin with an isocyanate, a polyol, a photo initiator, and methyl ethyl ketone, as a solvent.

7. The thermal insulation material of claim 6, wherein the polyol is a polyether polyol, a polyester polyol, a prolactone polyol, a polycarbonate polyol, or a polybutadiene polyol.

\* \* \* \* \*